United States Patent
Strech

(10) Patent No.: US 7,395,219 B2
(45) Date of Patent: Jul. 1, 2008

(54) INSURANCE ON DEMAND TRANSACTION MANAGEMENT SYSTEM

(76) Inventor: Kenneth Ray Strech, 30254 Gulfstream, Canyon Lake, CA (US) 92587

( * ) Notice: Subject to any disclaimer, the term of this patent is extended or adjusted under 35 U.S.C. 154(b) by 1028 days.

(21) Appl. No.: 10/315,959

(22) Filed: Dec. 9, 2002

(65) Prior Publication Data

US 2003/0139948 A1 Jul. 24, 2003

Related U.S. Application Data

(60) Provisional application No. 60/339,597, filed on Dec. 8, 2001.

(51) Int. Cl.
*G06Q 40/00* (2006.01)
(52) U.S. Cl. ........................................................ 705/4
(58) Field of Classification Search .................... 705/4
See application file for complete search history.

(56) References Cited

U.S. PATENT DOCUMENTS

| | | | | | |
|---|---|---|---|---|---|
| 4,766,539 | A | * | 8/1988 | Fox | 705/4 |
| 4,975,840 | A | * | 12/1990 | DeTore et al. | 705/4 |
| 5,855,005 | A | * | 12/1998 | Schuler et al. | 705/4 |
| 6,064,970 | A | * | 5/2000 | McMillan et al. | 705/4 |
| 6,119,093 | A | * | 9/2000 | Walker et al. | 705/4 |
| 6,868,386 | B1 | * | 3/2005 | Henderson et al. | 705/4 |
| 6,947,881 | B1 | * | 9/2005 | Murakami et al. | 703/8 |
| 7,124,088 | B2 | * | 10/2006 | Bauer et al. | 705/4 |
| 7,275,038 | B1 | * | 9/2007 | Weinstock et al. | 705/5 |
| 2002/0116228 | A1 | * | 8/2002 | Bauer et al. | 705/4 |
| 2007/0055553 | A1 | * | 3/2007 | Kwan | 705/4 |

OTHER PUBLICATIONS

Pauly, Guaranteed Renewability in Insurance, 1995, Journal of Risk and Uncertainty, vol. 10, No. 2, p. 143-156.*

* cited by examiner

*Primary Examiner*—Robert W. Morgan
*Assistant Examiner*—Tran N Nguyen

(57) ABSTRACT

An intermittent risk exposure liability insurance method comprising the steps of: establishing an Internet business site enabled for communication with insurers and insureds through Internet service providers; enrolling the insureds in intermittent risk exposure liability insurance policies, the policies providing for a variable insurance premium rate depending upon an intermittent use of an insured article; logging start and completion times of each intermittent use of the insured article on the Internet business site by the insured; verifying start and completion times of use of the insured article in accordance with the logged start and completion times; and applying and billing premium insurance rates in accordance with the verified and logged start and completion times of use.

1 Claim, 4 Drawing Sheets

INSURANCE ON DEMAND TRANSACTION MANAGEMENT SYSTEM

RELATED APPLICATIONS

This application claims priority and is entitled to the tiling date of U.S. Provisional application Ser. No. 60/339,597 filed Dec. 8, 2001, and entitled "Insurance On Demand Transaction Management System." The contents of the aforementioned application are incorporated by reference herein.

INCORPORATION BY REFERENCE

Applicant(s) hereby incorporate herein by reference, any and all U.S. Patents, U.S. patent applications, and other documents and printed matter cited or referred to in this application.

BACKGROUND OF THE INVENTION

1. Field of the Invention

This invention relates generally to commercial liability insurance for equipment, vehicles and the like, and more particularly to an Internet business method for adjusting insurance rates for such commercial liability based upon the communication potential of the Internet.

2. Description of Related Art

The following defines the present state of this field:

In its present form construction equipment insurance, for the most part, covers the more mundane untoward events such as fire, theft, possibly some categories of weather related loses and normal liability exposure for accidents occurring in an area under the insured's auspices such as a yard. It also has lumped in the policy or as a constant in force under, a provision covering the much higher risk exposure of equipment working in the field. The underwriter does not know the actual amount of high risk exposure to which a crane will be subject. They must rely on statistically determined industry usage criteria as a basis for assigning a premium cost. If, in actuality, an insureds usage pattern is below the predetermined level than they are, in effect, paying a higher premium than need be. If they exceed the traditional industry usage threshold the underwriter is overly exposed because the premium has been determined on less than actual job site risk exposure. The present invention improves on this by breaking out high risk exposure components and providing them through an on demand system. This is advantageous to both the insurer and the insured if performed as specified in the model. It will result in the insurer providing the high risk component of coverage at the appropriate rate for the entire length of the high risk exposure period. The insured on the other hand, only pays for this coverage on an as needed basis, it is broken out in specified increments and at a predetermined rate.

The prior art teaches the extending of insurance for commercial liability but does not teach an insurance on demand, Internet based, system such as is described and claimed herein. The present invention fulfills these needs and provides further related advantages as described in the following summary.

SUMMARY OF THE INVENTION

The present invention teaches certain benefits in construction and use which give rise to the objectives described below.

The present invention is an intermittent risk exposure liability insurance method comprising the steps of establishing an Internet business site enabled for communication with insurers and insureds through Internet service providers, enrolling the insureds in intermittent risk exposure liability insurance policies of the insurers, the policies providing for a variable insurance premium rate depending upon an intermittent use, by the insureds, of an insured article, logging start and completion times of each intermittent use of the insured article on the Internet business site by the insured, verifying start and completion times of use of the insured article in accordance with the logged start and completion times, and applying and billing premium insurance rates in accordance with the verified and logged start and completion times of use.

The present invention is a process for providing intermittent risk exposure liability insurance comprised of steps establishing an Internet site enabled for communication with risk assumption entities (RAE's) 300 (insurers) and insureds (customers) 100 through Internet service providers, facilitating contractual relationships (policies) for intermittent risk exposure liability insurance, enabling policies to be configured to allow for variable premium rates within one transaction based on changes in risk exposure as a function of time within one overall transaction, logging start and completion times of each intermittent use of the insured article or occurrence of a risk generating event on the Internet business site by the insured, verifying start and completion times of use of the risk generating article in accordance with logged start and completion times, and applying and billing insurance rates in accordance with the verified start and completion times.

This invention relates generally to providing liability insurance on an intermittent as needed basis and, more particularly, to management and facilitation of the transactions that will be required between Risk Assumption Entities (RAE's) 300, primarily, but not limited to, insurance companies and their customers. The present invention teaches a process by which the communication potential of the Internet may be used as a utility to provide Insurance On Demand.

This model provides another incidental benefit by making the insurance component cost of operating a piece of equipment readily apparent. This in and of itself is a convenience factor when customers, the insured, are establishing their rates or determining net profit on a job. In some instances equipment owners may choose to mark this cost component up and possibly even break it out on their customer's invoice. This would be similar to what is done in the car, truck and equipment rental businesses at considerable profit to those entities.

This model will also be configured to enable consumers instantaneous access to auto, truck or equipment insurance "On Demand" to satisfy rental agency requirements at more economical rates. This process will further accommodate the insurance needs of seldom used private or commercial vehicles, recreational equipment or unusually hazardous undertakings. In short, this process is designed to facilitate the providing of intermittent insurance coverage regardless of how the risk is generated.

A primarily objective of the present invention is to provide a liability insurance method having advantages not taught by the prior art.

Another objective is to provide such a method capable of reducing the cost of insurance and the exposure of insurers.

A further objective is to provide such a method capable of providing instant insurance coverage for standard liabilities.

A still further objective is to provide such a method capable of verifying the physical location of an insured equipment.

Other features and advantages of the present invention will become apparent from the following more detailed descrip-

DETAILED DESCRIPTION OF THE INVENTION

Figure 1:
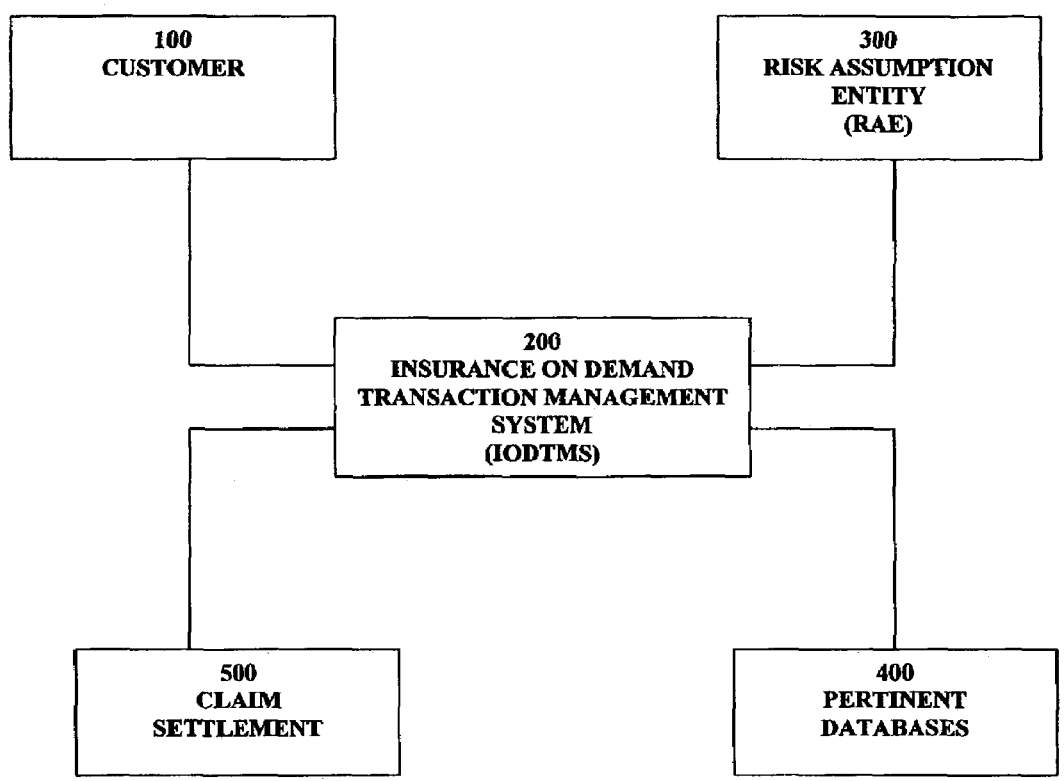
FIG. 1 is a block diagram operational overview of the subject system.
Figure 2:
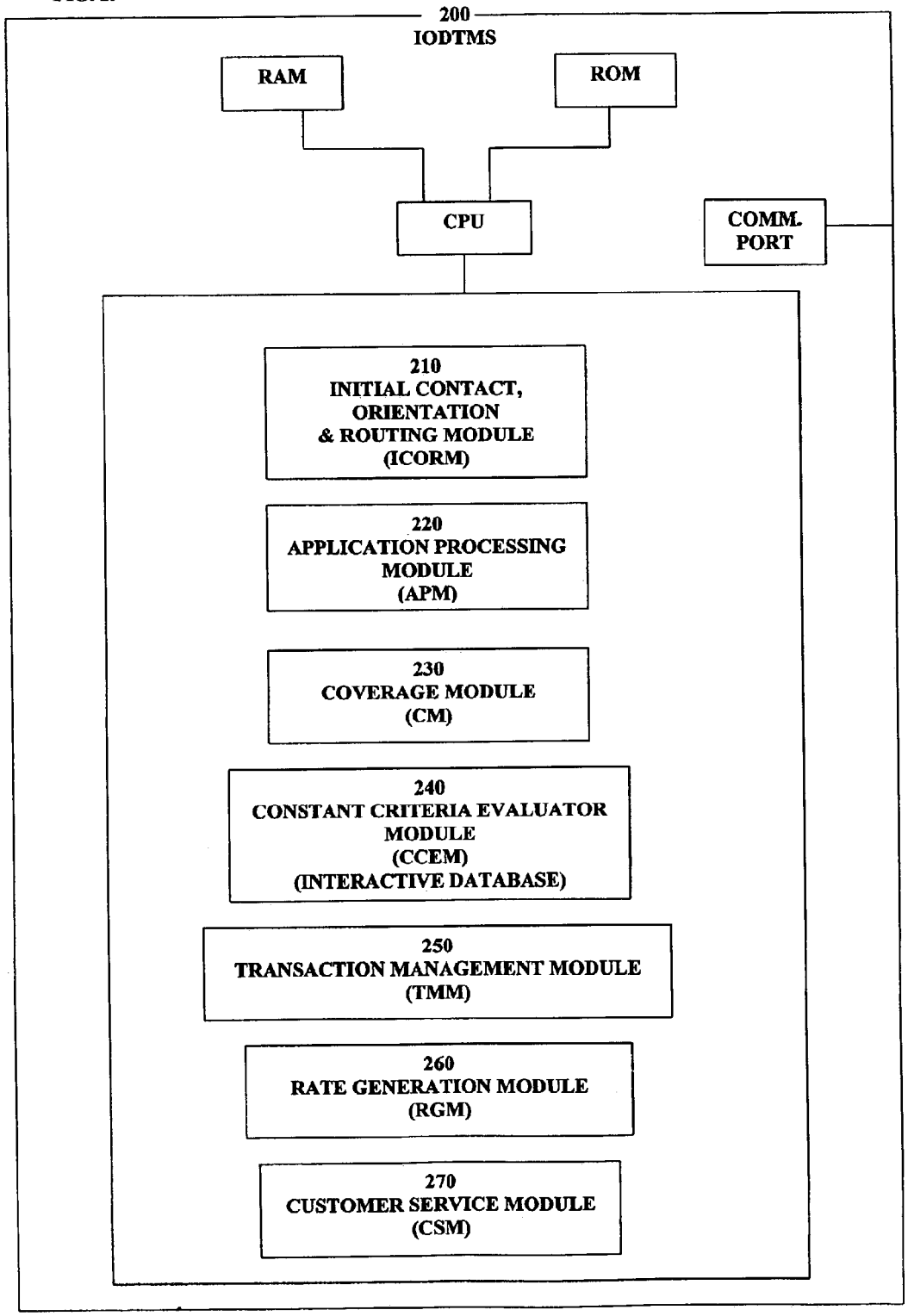
FIG. 2 is a block diagram identifying the principle data processing modules of the present invention.
Figure 3:
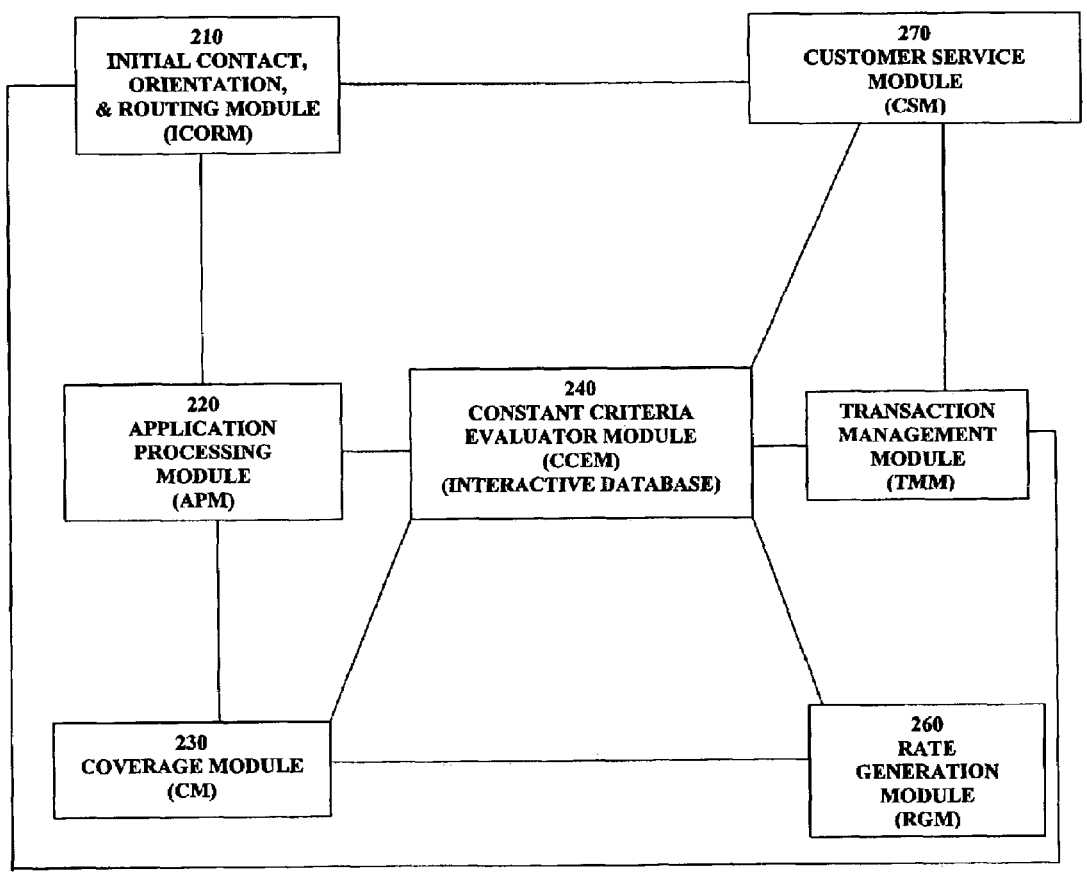
FIG. 3 is a block diagram data exchange interactions between data processing modules of the subject system.
Figure 4:
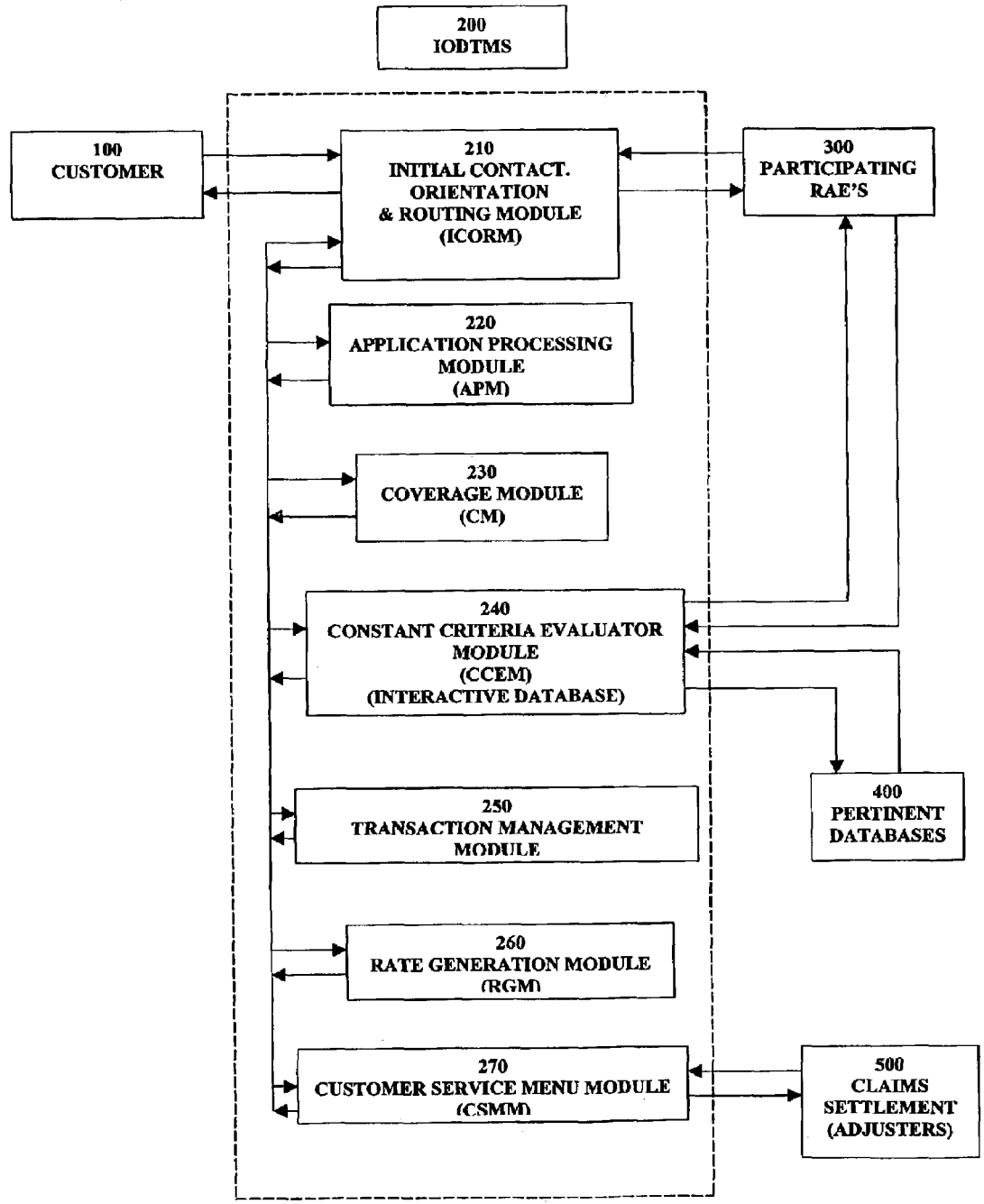
FIG. 4 is a flow diagram of possible data exchange between data processing modules of the subject system and entities external to the system.

The present invention teaches a business model that will have the following features and benefits not taught by prior art. The model will permit instantaneous access to a Risk Assumption Entity (RAE) 300 for intermittent risk exposure. The model will facilitate customers 100 ccess to risk coverage at pre-negotiated rates based on predetermined criteria which will be constantly updated. Customers 100 will be able to assist in this update process. They may seek to expand or contract their risk coverage portfolio at will. Coverage will be able to be secured for different dollar amount liability requirements such as a contract that may require higher liability coverage or a venue such as a private lake that may require proof of a particular level of coverage before one could use a watercraft there. The model will allow RAE's 300 to more closely target their risk exposure and adjust premiums accordingly since the model mostly addresses exposures of a shorter duration. The model may also allow for the bundling of risk exposures of a certain type into a financial instrument that may be traded to allow a company to hedge excess exposure in a particular category. This may also introduce market forces that may be triggered by changing risk factors or capital availability. A RAE 300 may choose to build a particular portfolio based on specific risk scenarios they have deemed to be in their best interest. The foregoing will be accomplished by the use of the Internet Wireless technology and the Satellite Global Positioning system in the following manner:

(A) Proprietary software will be written which will provide secure internet communication between the individual or commercial enterprise with a risk exposure and an RAE 300 such as, but not limited too, a coverage pool or insurance carrier Access to this facilitation process may be by subscription to both the potential insured and the RAE 300.

(B) This software will securely maintain customer provided information and constantly cross check if with other pertinent data bases to maintain an accurate risk worthiness profile.

(C) Pre-negotiated rates will be based on the profile mentioned above. Criteria for rate adjustments will also automatically be made when the pre-established rate change thresholds are reached.

(D) The software will further consider more random factors such as but not limited too current weather and the time of day a piece of equipment may be working.

(E) The software will have the ability to cross check in force policies to provide an insured with information indicating there may be coverage enforce that may mitigate a portion of their risk but are provided by a third party thus avoiding "double coverage" situations.

(F) wireless technology in concert with Satellite GPS will facilitate verification of equipment locations and work hours. A proprietary module will be developed that will utilize the previously mentioned technologies in order to verify working and non-working times in addition to location for a given piece of equipment. This will be possible as a result of the shrinking of devices their concomitant lower power consumptions and the time component inclusive in the GPS algorithms.

Acronym Key
1. I.R.E.=Intermittent Risk Coverage
2. R.A.E.=Risk Assumption Entity
3. S.I.M.=Secure Internet Means
4. C.C.E.=Continuous Criteria Evaluator Customer 100 Requests Specific Type of Intermittent Risk Coverage (I.R.C.) from Risk Assumption Entity (R.A.E.) 300 by Secure Internet Means (S.I.M.), Telephonic or other unspecified means R.A.E. 300, receives the request and determines if the coverage pool contains the category requested.

The model anticipates that claims for customer loses due to insured risk events will be handled through channels already established by R.A.E.'s 300 (insurance companies primarily) to service their existing client base. The model however, will utilize instantaneous internet access to expedite the claim settlement process. This access will aid the insured in administering it, and any service providers involved in the satisfying the claim. This process will be facilitated by software designed for this express purpose.

The Constant Criteria Evaluator, in addition to updating risk and rate assessments, will monitor all facets of customer 100 service. This will be accomplished by the use of proprietary software integrated into the design of the C.C.E. 240.

Means by which a rate is generated by a data module specifically configured for this purpose by means of its internal algorithm.

Means by which the "rate clock" for a given risk exposure is started, stopped or predetermined start/stop times are amended.

Means by which a contract is prepared in parallel to a customer's 100 application for service and/or completing information templates relating to their coverage need and requests.

The processes' Constant Criteria Evaluation function whereby an account's risk worthiness profile is constantly monitored and updated.

Means by which risk exposures of various types may be "bundled" into a financial instrument and traded to allow a company to hedge/mitigate its exposure in a certain category.

The present Invention is Capable of Achieving the Following:

Enrolling the insured in intermittent risk exposure liability insurance policies of the insurers, the policies providing for a variable premium rate depending upon variable risk exposure during an intermittent use, by the insured, of an insured article:

The step of verifying locations is enabled using a global positioning satellite method to determine the location of the insured article and communicating this information to the process databases by wireless means.

The step of posting of the insurance premium rates and insurance premium thresholds for various coverage categories for an account with a given risk worthiness profile score on the Internet site and of adjusting the posted premium rates and thresholds as necessary.

A further capability is to provide a means for potential a insured to determine premium rates for a particular intermittent risk exposure independent of the application and contract management phases of the process.

Another capability of the process is to reduce the cost of risk mitigation (insurance) for an insured and limit unnecessary risk exposure of insurers.

A further capability of the process is to enable providing instant insurance coverage for standard liabilities such as rental vehicles and the like.

A still further capability is to provide, within the process, a method of verifying the physical location and state of use of an insured equipment.

Another capability of the process is to facilitate the billing and settlement portions of contract management.

A further capability of the process is to allow individuals and business entities to apply for coverage via the Internet and have their risk worthiness profile evaluated as they apply.

A further capability of the process is to provide a means of constantly updating the risk worthiness profile and adjusting rates accordingly.

A further capability of the process is to expedite a customer's succeeding transactions by a means configured to learn the customers 100 equipment usage pattern and risk mitigation needs and then tender selection templates of coverage options closely matching their historical needs and requests.

The Invention Provides a Means by Which:

A rate is generated by a data module specifically configured for this purpose by means of its internal algorithm.

A rate clock for a given risk exposure is started, stopped or predetermined start and stop times are amended.

A contract is prepared in parallel to a customer's 100 application for service and their completing information templates relating to their coverage needs and requests.

An account's risk worthiness profile is constantly monitored and updated.

Risk exposures of various types may be "bundled" into a financial instrument and traded to allow a company to hedge and thus mitigate its exposure in a certain category.

The Present Invention is Further Enabled for:

Enrolling the insureds in intermittent risk exposure liability insurance policies of the insurers the policies providing for a variable premium rate depending upon variable risk exposure during an intermittent use by the insureds, of an insured article.

Verifying locations using a global positioning satellite method to determine the location of the insured article and communicating this information to the process databases by wireless means.

Posting of the insurance premium rates and insurance premium thresholds for various coverage categories for an account with a given risk worthiness profile score on the Internet site and of adjusting the posted premium rates and thresholds as necessary.

The Following Examples Further Define the Present Method:

Enrollment

An applicant will register to use the present invention method by accessing the dedicated Uniform Resource Locator (URL) for the system's website and completing a template questionnaire. This process will be accomplished by a system of hierarchical queries that, as satisfied, will lead to ever more detailed rate influencing information well known to those skilled in the alt of risk management.

It should be noted, when the applicant or customer 100 begins to fill in the application template they are immediately issued an Account identification Number (AIN) for tracking purposes internally within the system. This AIN is not published to the applicant until they satisfy the application requirements to the satisfaction of the CCE 240. An AIN is the customers virtual passport to navigate and avail themselves of the features and benefits of the system.

An alternative method of customer registration is accomplished through traditional Risk Assumption Entities (RAE's) 300 that have a website and have opted to provide their customers 100 the option of managing their risk on as as needed basis. On the RAE's 300 website home page, the present invention system option is displayed. The customer clicks on this option and is required to supply the RAE's 300 account identifying data. Once this is accomplished, to tile satisfaction of the RAE 300, the customer's data, necessary to fulfill the application requirements of the systems' CCE 240, CMM 230, and TMM 250 Modules, is transferred, in a format recognizable and utilizable by the system, to these modules as per a prior affiliation agreement (It is, of course, assumed in this embodiment that the affiliate RAE 300 will have all of the customer's pertinent rate influencing information on file). The initiation of this transfer processes causes the system to assign an AIN to this customer.

(Please see the Glossary for a Definition of Affiliation Agreements)

In either case, after satisfying the registration requirements, a risk profile will be determined based on the ability of the Constant Criteria Evaluator (CCE) 240 to verify the information provided and a risk worthiness profile score will be established. Alter a Risk Worthiness Profile Score (RWPS) has been established, the customer's AIN is published to them to facilitate their progressing through the succeeding steps in securing risk mitigation (insurance). (See customer decision and action sequence}

If information is immediately unverifiable this fact will be made known to the customer. Depending on the weight given to the criteria that is unable to be verified, the risk worthiness profile score will be adjusted upward. An upward adjustment will require an applicant to pay a correspondingly higher premium for a given coverage package.

This AIN will be used henceforth by the customer when they log on to the system website and by the present invention system to issue coverage binders and update the customer's risk worthiness profile. Once an AIN has been issued a customer can use an expedited transaction process to rapidly be issued a binder for a given risk activity.

Whenever the AIN is entered it will cause the system to peruse the risk worthiness profile associated with the AIN before allowing rates to be quoted and coverage bound for any given risk event or activity.

An influencing factor in establishing a risk worthiness profile would be experience a particular customer has in the activity in which they intend to engage.

The customer's AIN will be linked to other pertinent identification numbers such as an individual's birth date, Driver's License and Social Security Numbers. In the case of a business entity it could be linked to a company's Tax I.D., Corporate Registration or Resale Numbers. This will be done to negate the risk of using the wrong risk worthiness profile score or inaccurate information in determining a score Truck Rental Scenario A small company or individual needs to, rent a large truck. The rental agency has specific requirements regarding liability insurance that must be satisfied before they will rent a vehicle. The customer's 100 vehicle liability insurance has a very high deductible threshold before the Risk Assumption Entity (RAE) 300 assumes responsibility for a claim. The rental agency offers coverage on a daily basis, but the customer finds the premium to be very high, in their judgement, and decides to seek an alternative. The customer is aware that certain insurance carriers, RAE's 300, offer insurance on an intermittent as needed or "on demand basis" by means of the present system.

The following is a customer's 100 Contact, Decision and Action sequence for the rental or a large truck by means of initial contact with the system via an Internet site.

1. The customer 100 contacts the present invention system by accessing the system's Internet site through the use of the present invention system Uniform Resource Locator (URL) which causes. . . .
2. The homepage to display a menu of options one of which is "do you wish an explanation of the Insurance On Demand Transaction Management System (IODTMS) 200." The customer opts by clicking to receive an explanation which causes. . . .
3. The system displays an "orientation" synopsis of the services provided and the method of operation of the IODTMS 200. A roster of participating RAE's 300 is provided as part of the orientation process. At the end of the synopsis the customer is Liven the option of applying for service from the system. The customer 100 opts to do so which causes. . . .

NOTE: The customer 100 is offered the option of more in depth information on the various features and benefits of the system at various intervals within the synopsis.

4. The Internet site to display a menu/template requesting rate influencing information from the customer 100. The template proceeds hierarchically from the general to the increasingly specific (the necessary rate influencing information sought is well known to those skilled in the art of risk mitigation). This information is used to establish a Risk Worthiness Profile Score (WRPS) for this particular customer (see the Glossary for an explanation of the WRPS). At the initiation of the application process an Account Identification Number (AIN) will be issued to the applicant, however the AIN is not immediately published to the customer 100. When the customer is issued an AIN, the present invention system Transaction Management Module (TMM) 250 will begin preliminary stages of contract preparation. The TMM continues to prepare the contract in parallel with the customer's decision sequence responses, utilizing information derived therefrom. The completion of the application template process (to the satisfaction of the present invention system Constant Criteria Evaluator (CCE) 240 triggers the disclosure of the AIN to the customer which causes. . . . (see the Glossary For and explanation of the CCE 240.
5. The notification to the customer that they have been issued an AIN causes the system Coverage Module (CM) 230 to display a template of various risk categories for which coverage is offered through the IODTMS 200. In this case, the customer 100 selects the category "Vehicle" which causes. . . .
6. The present invention system CM 230 to display a template containing several subcategories, one of which contains the heading "Truck." The customer selects the heading "Truck" at which time a template is displayed requesting specific information about the truck and the circumstances of its intended liability exposure (ie. Make/model, GVW (gross vehicle weight), that it will or won't be used for specified hazardous material hauling, alternate driver, etc. The customer 100 satisfies these queries which causes. . . .
7. A template to be displayed requesting the level of coverage dollar amount the customer 100 desires. This template will also request the customer 100 to specify the time increments in which they wish to be billed. Completion of this template causes. . . .
8. The present invention system to display a template which includes the rate for the requested coverage in the RWPS category of the customer 100. The template offers the customer the option of accepting or declining coverage at the displayed rate. This template will also display invoice settlement options from which the customer 100 may select. The options displayed from which the customer 100 selects are dependent upon the customers RWPS and their previous relationship with affiliate RAE's 300. Their selection will be incorporated in the final contract. The customer's selecting a settlement option causes. . . .
9. The selection of a settlement option is interpreted by the present invention system as an indication that the customer 100 wishes to enter into a contract, with all its previously enumerated terms and conditions for risk mitigation (insurance) with a participating RAE 300, at the displayed rate, utilizing the present invention system by acknowledging acceptance by clicking in the space provided on the template which causes. . . .
10. A template to be displayed requesting the customer 100 to enter the time at which the rate clock is to start (ie. On issuance of a "binder" or some future time specified by the customer 100). Satisfaction of this requirement causes. . . .
11. Upon satisfaction of the present invention system's request for the rate clock start time (they may enter a predetermined stop time as well per the rate clock protocol explained in the Glossary), the customer 100 is shown an electronic representation of their contract with the selected RAE 300 and they electronically verify and acknowledge their approval of the agreement (electronically sign) the contract which causes. . . .
12. The customer to be issued an electronic binder with their AIN and a code number that has been assigned to the completed contract for reference at any time.
13. The customer rents the truck, no claim generating event occurs And the truck is returned to the rental company which causes. . . .
14. The rate clock to be stopped in one of the following manners:
A. The predetermined rate clock stop time (as per tile start and stop template in #11 of this sequence) passes triggering the cessation of the RAE's 300 "risk exposure" and thus the customer's coverage.

OR

B. The customer accesses the present invention system Internet site and navigates through the rate clock stop process via a template to facilitate selection of start and stop times and amendment of start and stop times. At this time they will stop the rate clock (see the explanation of this process in the Glossary).
15. Stopping the rate clock causes the TMM 250 to prepare an invoice as per the governing contract between the customer and the RAE 300. This invoice is immediately transmitted to the customer as per procedures established in the TMM 250.

16. Settlement is Accomplished by means of debiting a credit card account (the number of which will have been acquired during the application process), by debiting a balance held on account or by billing the customer according to other contractually specified terms (as per #8 in this sequence).

17. A claim generating event occurs and the customer contacts the present invention system claims adjustment representatives by accessing the Customer Service Module (CSM) 270 from the present invention system Internet site homepage (see the Glossary for an explanation of the CSM) 270.

Below is an example of a typical risk generating situation in which the Insurance On Demand Transaction Management System present invention system may be employed to provide liability insurance. Following the scenario is a customer interaction sequence necessary to secure liability coverage from a Risk Assumption Entity (RAE) 300 (RAE's 300 are primarily insurance companies) that is affiliated with the IODTMS 200.

Crane Rental

A steel building election company owns a crane that is used intermittently. They occasionally rent the crane when it is not required on their own job sites. The company has analyzed their intermittent usage pattern and the varying liability coverage (dollar amount) requirements of different work venues, and opted to insure their operational (high) liability on an "as needed" or "on demand" basis. They have accomplished their goal by doing business with an RAE 300 that utilizes the IODTMS 200 system utility.

It is assumed, for the sake of the following illustration, that their present RAE 300 would have all pertinent rate influencing data on file. It is further assumed that, through the RAE's 300 prior affiliations agreement with the IODTMS 200, all customer information will be formatted to facilitate its transfer to, and use by, the IODTMS 200.

NOTE: After initial registration and issuance of an Account Identification Number (AIN), the customer 100 will be able to expedite future intermittent liability insurance transactions by entering the AIN as soon as they access the website.

Glossary Attached: An explanation of the configuration and function of Insurance On Demand Transaction Management System modules, referred to by acronym can be found in the attached glossary. This is true, as well, of other terms the reader may encounter that are specific to this document.

The following is a Customer's 100 Contact, Decision and Action Sequence for a Crane Use Risk Mitigation (Insurance) Transaction as a result of initial contact with their current RAE (Insurance Provider)

1. The participating RAE 300 has a website with a dedicated URL. The customer 100 accesses this website.
2. On the RAE's, 300 homepage, the present invention system option is displayed. The a customer 100 accesses by clicking on this option and is required to supply the RAE's 300 account identifying data. Once this is accomplished, to the satisfaction of the RAE 300, the customer's, data, necessary to fulfill the requirements of the present invention system CCE 240, CM 230, RGM 260 and TMM 250 Modules, is transferred, in a format recognizable and utilizable by the present invention system, to these modules as per a prior Affiliation Agreement (see glossary). The initiation of this transfer process causes the present invention system to immediately assign an Account identification Number (AIN) to this customer, however the AIN is not immediately published to the customer. The CCE 240 must process and evaluate the customer's information, provided via the affiliated RAE 300, to establish a Risk worthiness Profile Score (RWPS) before the AIN may be published to the customer.

(The Functions of RWPS and CCE 240 are Explained in the Glossary.)

NOTE: After the data transfer process is accomplished and an AIN is issued and published to them, it will only be necessary for the customer to enter their AIN when they access the website of the present invention system or their original RAE 300 to initiate Future transactions. The customer will also be able to obtain just the premium rate for a particular coverage category in an expedited fashion once they have an AIN.

NOTE: When the customer 100 is issued an AIN, the Transaction Management Module (TMM) 250 (the function of which is explained in the glossary) will begin preliminary stages of contract preparation. The TMM 250 continues to prepare the contract in parallel with the customers 100 decision sequence, utilizing information derived therefrom.

2A. When the present invention system data requirements have been fulfilled, the IODTMS 200 issues and displays, to the customer 100 their respective present invention system AIN.

3. The notification to the customer that they have been issued an AIN causes the CM 230 to become engaged in the transaction process and to display a menu of various risk categories for which coverage is offered through the IODTMS 200.

4. The customer 100 selects the category "Heavy Equipment."

5. The CM 230 displays a menu containing several sub-categories, one of which contains the heading "Crane."

6. The customer 100 accesses by clicking on the heading "Crane" at which time a template is displayed requesting specific information about the crane and the circumstances of its intended liability exposure (ie. make and model, lifting capacity, any previous equipment failures on it, the hours of anticipated operation (day or night, high traffic) and the like).

7. The customer 100 satisfies these queries which causes a template to be displayed requesting the level of coverage (dollar amount) the customer desires. This template also requests the customer 100 to specify the time increments in which they wish to be billed. At this point in the decision sequence the customer may be offered the variable coverage option if they are eligible (please see the glossary for an explanation of the variable coverage option).

8. The customer 100 completes the previous template which causes the present invention system CM 230, after communication with the Rate Generation Module (RGM) 260 (see the glossary for an explanation of the RGM's 260 function), to display the rate for the requested coverage in the Risk Worthiness Profile Score category of the customer. The Rate is displayed as per the time increment specified by the customer 100 for billing. Alternative time increment billing rates may also be displayed at this time for the customer's 100 comparison.

9. A template is displayed by the CM 230 offering the customer 100 the option of accepting or declining coverage at the displayed rate. This template will also display invoice settlement options from which the customer may select. Their selection will be incorporated in the final contract. The options displayed from which they may select are dependent upon the customers 100 RWPS and their previous relationship with the affiliate RAE 300.

10. The customer 100 opts to enter into a contract with its attendant terms and conditions, for risk mitigation (insurance) with an RAE 300, at the displayed rate, utilizing the present invention system by acknowledging acceptance (clicking) on the space provided in the template 11. A template is then provided for the customer to enter the time at which the rate clock is to start (ie. On issuance of a "binder" or some future time specified by the customer 100).

12. Upon satisfaction of the present invention system request for the a rate clock start time (they may enter a predetermined stop time as well as per the rate clock protocol explained in the glossary), the customer 100 is shown an electronic representation of their contract and they electronically verify and acknowledge their approval of the agreement (electronically sign).

13. The customer 100 is issued an electronic binder with their AIN and the contract code number that has been assigned to the completed contract for reference at any time.

14. The customer 100 dispatches the crane to the job, site the work is completed successfully, no claim generating event occurs and the crane returns to the relative safety of the company's equipment yard (if a claim generating event occurs, see #18 in this sequence).

15. In this embodiment, the return of the crane to the company's yard completes the "risk exposure". The rate clock would now be stopped in one of the two following ways:

The predetermined rate clock stop time passes triggering the cessation of the RAE's 300 risk exposure and thus the customer's coverage.

The customer 100 accesses the website and navigates through the rate clock stop process and stops the rate clock (Please see the explanation of this procedure in the glossary).

16. Stopping the rate clock causes the TMM 250 to prepare an invoice as per the governing contract between the customer 100 and the RAE 300. This invoice is immediately transmitted to the customer as per the Rate Clock Protocol enumerated in the TMM 250 (this function of the Transaction Management Module (TMM) 250 is explained in the glossary).

17. Settlement is accomplished by means of debiting a credit card account (the number of which will have been acquired during the application process), by debiting a balance held on account or by billing the customer 100 according to other contractually specified settlement terms (as per #9 in this sequence).

18. A claim generating event occurs and the customer contacts the present invention system claims adjustment representatives by accessing the Customer Service Module (CSM) 270 from the present invention system home page (please see the glossary for a description and flow chart for the present invention system claim settlement procedure via the Customer Service Module).

The following terms are defined as to meaning and usage in the present application in the glossary below:

Affiliation Agreement: A prior affiliation agreement will be required of all present invention system participating Risk' Assumption Entities (RAE's) 300. This agreement specifies standard terms and conditions under which all affiliated RAE's 300 (insurance companies) will contract with insureds to provide liability coverage in a given risk exposure category. These conditions will include, but are not limited to, agreeing to abide by premium rates set by the IODTMS 200 for a given risk exposure, agreeing to the present invention system method of setting, rates for individual account's (AIN's) in a risk category by means of a Risk, Worthiness Profile Score (RWPS) determined by the present invention system and the method by which risk exposure intervals are determined by the present invention system Rate Clock Protocol (RCP). In addition the affiliate agreement may limit coverage categories for which a particular RAE 300 will agree to assume risk.

AIN=Account Identification Number: This is the "tracking number" assigned to an applying entity (customer) 100 when the application process is initiated. This number will be cross-referenced with other numbers particular to a customer such as, but not limited to, birth date, driver's license, corporate registration or tax identification numbers. After initial registration with the IODTMS 200 the customer will input their AIN upon contacting the present invention system Internet site to expedite their transactions.

APM 220=Application Processing Module: This module processes rate influencing information provided by customers that access the present invention system Internet site directly. It solicits information from customers through a system of menu templates that proceed through a hierarchy from the general to the increasingly more specific (necessary rate influencing information sought is well known to those skilled in the actuarial art of risk mitigation). Through its evaluation and decision algorithm and interaction with the CCE 240 the APM 220 will determine the veracity, completeness, and accuracy of information provided by customers and will, to the extent technologically possible, notify applicants, in real time, of any discrepancies to afford them the opportunity to make immediate corrections to their application. The customer's Account Identification Number (AIN) is issued and after satisfaction of information criteria, published to the customer by the APM 220 through interaction with the Constant Criteria Evaluator (CCE) 240. The APM 220 also transmits information it receives to the Transaction Management Module (TMM) 250 to enable the TMM 250 to begin the contract preparation process in parallel with the application process.

CCE 240=Constant Criteria Evaluator: This present invention system module is the system's central interactive database. This device is the repository of all customer 100 risk worthiness and account history data. It will be so configured as to constantly evaluate and reconcile customer 100 data on file or received at the time of application and registration with that found in other pertinent databases that have acquired more current information. This external data source could be, but is not limited to, a state motor vehicle department. This function will be accomplished by means of a "constant query device" such as, but not limited to, an Internet "web crawler," that, in effect, will carry a customers 100 risk worthiness profile with it as it peruses other databases for a real time comparison. When a discrepancy between information in the customer's 100 baseline risk worthiness file and a pertinent database is discovered and verified, the risk worthiness file will be updated. If the updated information tends to degrade the Risk Worthiness Profile Score (RWPS), an adjustment may be made in the rates assigned for risk assumptions undertaking after the time of the update to the RWPS.

A positive enhancement may also result if a negative factor has aged to the degree that it no longer warrants negative weighting with respect to rate-influence. (The data gathering function of the CCE 240 will be performed within the constraints of all statutory privacy provisions as well as limited powers of inquiry delegated by applying customers after they have been duly informed of the use to be made of the authorized gleaned information). The CCE 240 also provides decision influencing information to other specialized modules within the present invention system on a real time basis, thus optimizing the processing of information by those modules evaluation and decision algorithms.

CM 230=Coverage Module: The CM 230 is accessed either through initial contact with a present invention system affiliated RAE 300 or by initial contact with the present invention system Internet site directly. After a customer has been issued an Account Identification Number (AIN), the CM 230 provides menu templates of articles and activities for which the present invention system may provide coverage. When a customer selects a category, the CM 230, by means of its evaluation and decision algorithm, requests specific information necessary to complete a risk assumption contract (insurance policy) with an RAE 300. The CM 230 also communicates with the Transaction Management Module (TMM) 250 in the process of preparing a contract that begins at the initiation of the application processes and proceeds in parallel as information is provided by the customer The CM 230 further communicates with the Rate Generation Module (RGM) 260 to enable the CM 230 to quote a premium rate for a given coverage package.

CSM 270=Customer Service Module: The CSM 270 will, by means of its evaluation and decision algorithm, function as a "clearing House" to customer inquiries regarding a prior contract or a contract in progress it will aid customers in all preliminary claim preparation functions to expedite service from the claims adjuster designated by the RAE 300 which assumed the risk for which the liability claim is to be filed Customer initiated the updates will be accomplished by the CSM 270. These include, but are not limited to, updating rate influencing or credit information and change of electronic or physical address by means of the CSM's 270 interaction with the Constant Criteria Evaluator (CCE) 240. The CSM 270 will be the point of contact for billing inquiries through interaction with the Transaction Management Module (TMM) 250. The CSM 270 will interact with any and all present invention system databases to satisfy customer information requests. The CSM 270 will also be the IODTMS 200 point of liaison with designees of affiliate RAE's 300 to access the system as needed to perform the functions for which they have been assigned by a particular RAE 300. An example of such a designee would be claims adjusters or a third party contract settlement house that may be designated to collect premiums. These examples are not to be construed to limit the function of the CSM 270 in any way.

ICORM 210 initial Contact, Orientation, and Routing Module: This module, by means of its evaluation and decision algorithm displays the initial contact menu on the present invention system Internet site. Potential insureds (customers) select from the options displayed such as, but not limited to: "Would you like an explanation of our system and services?" "Would you like to apply for risk mitigation (insurance)?" "Enter your AIN if it has been issued previously to expedite this transaction" or "Do you wish information regarding a prior transaction?" he present invention system will additionally, by means of its evaluation and decision algorithm, provide orientation information including, but not limited to, an overview of the concept of Insurance On Demand, a comparison of the present invention system with traditional risk mitigation models and all legally required disclaimers from within the ICORM 210 database. Based on initial menu selections made by customers, they are routed to appropriate databases within the present; Invention system. For example, if a customer answers the initial contact menu question "Do you need to file a claim?" affirmatively, the insured will be routed by the ICORM 210 to the Customer Service Module (CSM) 270 for initial claim processing and liaison with their contracting RAE's 300 designated claims adjuster. In another example, if an insured enters their previously issued AIN they will be asked via a menu displayed "if they wish to duplicate a type of prior transaction." If the insured answers affirmatively, they will be routed to the CSM 270 for accommodation of their request.

RAE 300=Risk assumption Entity: Risk Assumption Entities are to be considered as any business entity configuration whose partial or sole function is to provide the opportunity for the mitigation of risk (insurance). In the main, this primarily includes insurance companies but RAE's 300 may assume other forms to provide actuarially determined risk management opportunities.

RCP=Rate Clock Protocol: The Rate Clock Protocol is contained within the Transaction Management Module (TMM) 250. It operates by means of an evaluation and decision algorithm that enables insureds to predetermine the interval for which they desire liability coverage. It also provides a means of allowing the start and stop times of an interval to be entered in the contact at a later date if the actual exposure interval is not precisely known at the inception of the contract. The rate clock algorithm is also designed to accommodate the amendment of rate clock start and stop times defining a risk exposure interval, if it is warranted under the terms of the governing contract. This algorithm is further designed to record rate clock start and stop times of segments of different risk levels within one overall transaction to enable the present invention system to provide a variable coverage option and the variable premium rates attendant to such an option.

RGM 260=Rate Generation Module: The RGM 260, by means of its distinct evaluation and decision algorithm, establishes rates for particular RAE's 300 risk assumptions by means of actuarial determinants well known to those skilled in the art of risk mitigation (insurance). In addition, the RGM 260 nteracts with remote databases, through the Constant Criteria Evaluator (CCE) 240, to compare the RGM's 260 determinations with industry standards. The RGM 260 determines premium rates in all categories based upon a proprietarily established risk worthiness scale. The RGM 260 interacts with the Coverage, Module (CM) 230 to provide the CM 230 with requested premium rates on specific risk exposures in order that rates may be communicated to potential insureds. This notification to insureds may be accomplished as they are actively seeking coverage (during the preparation of a contract) or merely to provide potential insureds premium rate information so they may refer to it as a risk mitigation (insurance) option. Also through the CCE 240, the RGM 260 may use external event criteria such as, but not limited to, severe weather predictions in an area on a real time basis to adjust rates before they are quoted.

RWPS=Risk Worthiness Profile Score: A risk worthiness profile is determined by comparing rate influencing information provided by the registering or applying entity with databases that may contain the requested information to determine the veracity or completeness of that provided by the registering entity. Once compiled, this information is compared with baseline risk worthiness profile standards well known to those skilled in the actuarial art of risk mitigation in addition to proprietary standards of the present invention system to determine and issue a proprietary Risk Worthiness Profile Score for an applying entity.

TMM 250=Transaction Management Module: The TMM 250 receives input from the Application Processing Module (APM) 220 and the Coverage Module (CM) 230 to enable this module by means of its distinct evaluation and decision algorithm to prepare a risk mitigation contract (insurance policy) in parallel with the APM 220 nd CM 230 as those nodules receive the potential insureds data. The TMM 250 contains the risk exposure Rate Clock Protocol (RCP) algorithm. The TMM 250 prepares invoices as per premium rates and verified risk exposure intervals. The TMM 250 transmits these invoices to insureds immediately after preparation. The TMM 250 administers the settlement of an account by means specified in the contract; especially, but not limited to, by means of credit card, debit card or account debit transactions. The TMM 250 distributes proceeds of the settlement of a particular contract (policy) to the RAE 300 that was the risk assuming patty named in that contract. The TMM 250 also monitors claims settlement procedures that are most particularly the province of the Customer Service Module (CSM) 270. The TMM 250 transfers pertinent account data to the Constant Criteria Evaluator (CCE) 240 for archiving.

Variable Coverage Option: Generically, within the present invention system, tile variable liability coverage option entails the assumption, by the RAE 300, of different levels of risk within one overall transaction which allows the RAE 300 to access premium rates concomitant with these varying risk levels. This option, in order to be contractually exercised, must be selected at the initiation of a contractual risk assumption by an RAE 300. Specific types of articles and their usage may be particularly suited to this type of risk management because of clear delineations of risk level in the usage pattern of the article. A crane, for instance, may be caused to go on standby status at a job site which reduces its liability exposure from that which it would experience under active operation. With the variable coverage option, the cranes owner will he able to change to a lower level of coverage during the standby period with its attendant lower premium assessment. This will be accomplished by means of a variable rate evaluation and decision algorithm protocol within the Transaction Management Module (TMM) 250. The TMM 250 will be accessed through the Initial Contact, Orientation and Routing Module ICORM) 210. The variable coverage option, when exercised, will neccessitate alteration of the individual transaction rate clock protocol established at the outset of the contract. Provision for this accommodation has been made within the evaluation and decision algorithm of the TMM's 250 Rate Clock Protocol (RCP).

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method of providing on-demand access to intermittent risk exposure liability insurance, comprising:
    (a) establishing an Internet Web site;
    (b) providing access to said Internet Web site to a plurality of insurers and an insured;
    (c) requesting, through said Internet Web site, insurance coverage for the insured from the plurality of insurers;
    (d) issuing an insurance policy for the insured and preparing an insurance contract, wherein said issuing and preparing are performed in realtime and in parallel;
    (e) specifying, by the insured through said Internet Web site, a plurality of future time periods wherein the insured is exposed to said intermittent risk, wherein each future time period comprises a start time and a completion time;
    (f) as time progresses, allowing the insured to amend the plurality of future time periods through said Internet Web site, wherein each amended future time period has not occurred, and wherein said amending comprises at least one of:
        (i) modifying the start time if the start time has not occurred;
        (ii) modifying the stop time if the stop time has not occurred;
    (g) logging the actual start time and actual completion time of each future time period via said Internet Web site, wherein the future time period has occurred;
    (h) providing said insurance coverage for the insured, wherein said insurance coverage comprises coverage for said intermittent risk exposure liability based upon the occurred time periods, wherein each time period is specified by an actual start time and an actual completion time;
    (i) terminating said insurance coverage after all future time periods have occurred.

* * * * *